US012746963B2

(12) United States Patent
Schmidt

(10) Patent No.: US 12,746,963 B2
(45) Date of Patent: Sep. 29, 2026

(54) SYSTEMS AND METHODS FOR A CRATE LIFTING MECHANISM

(71) Applicant: GE Precision Healthcare LLC, Waukesha, WI (US)

(72) Inventor: Andrew Schmidt, Hawthorn (AU)

(73) Assignee: GE Precision Healthcare LLC, Waukesha, WI (US)

( * ) Notice: Subject to any disclaimer, the term of this patent is extended or adjusted under 35 U.S.C. 154(b) by 300 days.

(21) Appl. No.: 18/586,245

(22) Filed: Feb. 23, 2024

(65) Prior Publication Data

US 2025/0269891 A1 Aug. 28, 2025

(51) Int. Cl.
*B62B 5/00* (2006.01)

(52) U.S. Cl.
CPC .......... *B62B 5/0086* (2013.01); *B62B 5/0083* (2013.01)

(58) Field of Classification Search
CPC ............................ B62B 5/0086; B62B 5/0083
See application file for complete search history.

(56) References Cited

U.S. PATENT DOCUMENTS

| | | | | |
|---|---|---|---|---|
| 4,918,783 | A * | 4/1990 | Chu | B60B 33/04 280/43.17 |
| 5,457,849 | A * | 10/1995 | Branson | H05K 7/186 16/33 |
| 6,450,515 | B1 | 9/2002 | Guth | |
| 6,520,460 | B2 * | 2/2003 | Hallberg | F16M 11/18 248/188.8 |
| 7,300,063 | B1 * | 11/2007 | Prizmich | B62B 5/0083 280/47.15 |
| 8,662,252 | B2 * | 3/2014 | Ogden | E04G 1/02 182/115 |
| 10,520,020 | B2 | 12/2019 | Choueifati | |
| 10,632,787 | B1 * | 4/2020 | Goetsch | B62B 3/0606 |
| 11,179,968 | B2 | 11/2021 | Huang | |
| 11,712,924 | B2 | 8/2023 | Peterson | |
| 11,760,506 | B2 * | 9/2023 | Batzakis | B64F 5/10 269/315 |
| 2005/0225047 | A1 * | 10/2005 | Schilling | B62B 5/0086 280/79.7 |

(Continued)

FOREIGN PATENT DOCUMENTS

| | | |
|---|---|---|
| CN | 107962912 A | 4/2018 |
| CN | 106004243 B | 9/2018 |

OTHER PUBLICATIONS

Skelang, "Skelang 2" Spring Loaded Gate Caster, Retractable 2-½" Swivel Gate Caster Wheel for Garden Wooden Gate, Yard Fence, Load Capacity 110 Lbs," accessed on Jul. 22, 2024 [https://www.amazon.in/Skelang-Spring-Loaded-Retractable-Capacity/dp/B083YW1C6G/ref=mp_s_a_1_19?adgrpid=54409998450&ext_vrnc=hi&hvadid=598479430727&hvdev=m&hvlocphy=9061991&hvnetw=g&hvqmt=b&hvr and=9873095172127243926&hvtargid=kwd-297941279697&hydadcr=25186_2661222&keywords=retractable.

(Continued)

*Primary Examiner* — Erez Gurari

(57) ABSTRACT

A crate lifting system can include two or more extendable supports configured to slide under a crate and a set of lifters attachable, each of the lifters to be attached to an end of the extendable supports, wherein each lifter is configured to raise the crate from a surface. The crate lifting system can also include a set of bolts that engage with the extendable supports through the set of lifters, wherein the set of bolts are configured to lift the crate as the set of bolts are rotated.

8 Claims, 12 Drawing Sheets

100

(56) References Cited

U.S. PATENT DOCUMENTS

| | | | | |
|---|---|---|---|---|
| 2009/0185885 | A1* | 7/2009 | Cozza | B62B 5/0083 414/800 |
| 2010/0237577 | A1* | 9/2010 | Bolster | B62B 3/0643 280/79.7 |
| 2017/0282778 | A1* | 10/2017 | Young, Jr. | B62B 3/04 |
| 2018/0050715 | A1* | 2/2018 | Cozza | A47F 5/137 |
| 2021/0163053 | A1* | 6/2021 | Zhang | B62B 5/0089 |
| 2025/0269891 | A1* | 8/2025 | Schmidt | B62B 5/0086 |

OTHER PUBLICATIONS

Solejazz, "Solejazz Workbench Caster kit 4 Heavy Duty Retractable Workbench Caster Wheel All Steel Construction Urethane Wheels, Bonus Install Template," accessed on Jul. 22, 2024 [https://www.amazon.in/SOLEJAZZ-Workbench-Retractable-Construction-Urethane/dp/B07V6X2LNB/ref=sr_1_1?crid=2HLQYRGX9ZLC2&keywords=retractable%2Bcaster&qid=1697758181&sprefix=retractable%2Bcaster%2Caps%2C187&sr=8-1&th=1], 5 pages.

* cited by examiner

100

200

400

800

900

SYSTEMS AND METHODS FOR A CRATE LIFTING MECHANISM

BACKGROUND

The transportation and handling of heavy objects, such as crates, within industrial, commercial, and logistical environments present significant challenges, particularly when it comes to ensuring the safety of personnel and preventing injury. Traditional methods of moving heavy crates often require manual lifting or the use of forklifts, which may not always be practical or available, especially in confined spaces or when crates are placed against walls.

Historically, one form of lifting heavy objects involved manual labor. This included techniques such as bending the knees and keeping the back straight to lift with the legs rather than the back, using the human body as a lever. Teams of workers would often lift in unison to distribute the weight of an object more evenly. However, these methods are inherently limited by human strength and are associated with a high risk of injury, particularly to the back and spine.

To overcome the limitations of human strength, simple mechanical aids were introduced. The lever is one example of a simple machine that has been used. By applying force at one end of a rigid bar that pivots around a fulcrum, a lever can amplify the lifting force and move heavy loads.

Techniques herein are configured to address the technical challenges of lifting heavy objects by providing a versatile and efficient means of lifting and moving heavy crates without the need for extensive manual labor or specialized machinery such as forklifts. The system is adaptable to various crate orientations and positions, whether there is ample space around the crate or if it is positioned against a wall with limited access.

BRIEF DESCRIPTION

This section is provided to introduce a selection of concepts that are further described below in the Detailed Description. This Brief Description is not intended to identify key or essential features of the claimed subject matter, nor is it intended to be used as an aid in limiting the scope of the claimed subject matter.

In one example, a crate lifting system can include two or more extendable supports configured to slide under a crate and a set of lifters attachable, each of the lifters to be attached to an end of the extendable supports, wherein each lifter is configured to raise the crate from a surface. The crate lifting system can also include a set of bolts that engage with the extendable supports through the set of lifters, wherein the set of bolts are configured to lift the crate as the set of bolts are rotated.

In one example, a method for lifting a crate can include mounting a set of boots to each end of the crate when extendable support insertion is not possible, attaching a lifter to each of the boots, and raising the crate from a surface using bolts that engage with the each of the boots through the lifter attached to each of the boots.

In another example, a crate lifting system can include two or more extendable supports configured to slide under a crate, an electronic lifter attachable to each end of the two or more extendable supports, wherein the lifter includes an integrated electric motor for raising and lowering the crate, and a set of rotating wheels attached to each electronic lifter, the set of rotating wheels facilitating movement of the lifted crate. The crate lifting system can also include an emergency stop feature configured to immediately stop a lifting operation for the crate.

Various other features, objects, and advantages of the invention will be made apparent from the following description taken together with the drawings.

BRIEF DESCRIPTION OF THE DRAWINGS

The present disclosure will be better understood from reading the following description of non-limiting examples, with reference to the attached drawings broadly described below.

Figure 1:
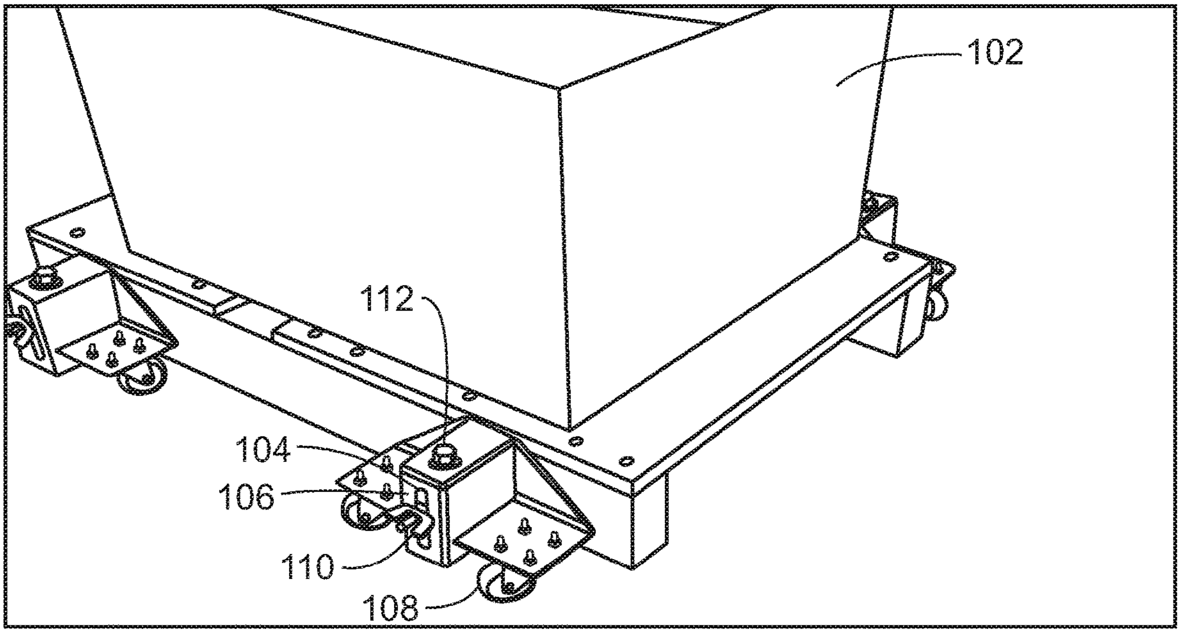
FIG. 1 is a perspective view of a lifting mechanism attached to a crate.

The drawings illustrate specific aspects of the described components, systems and methods for a lifting mechanism. Together with the following description, the drawings demonstrate and explain the principles of the structures, methods, and principles described herein. In the drawings, the thickness and size of components may be exaggerated or otherwise modified for clarity. Well-known structures, materials, or operations are not shown or described detail to avoid obscuring aspects of the described components, systems and methods.

DETAILED DESCRIPTION

Embodiments of the present disclosure will now be described, by way of example, with reference to FIGS. 1-11, in which the following description relates to various examples of a crate lifting mechanism described herein. The following description relates to various techniques, methods, non-transitory computer-readable media, and systems for lifting crates or any other suitable objects with a lifting mechanism.

Techniques herein have the technical advantage of lifting crates or any other suitable heavy object from a floor to a higher location for transportation. In some examples, the technical advantages described herein enable lifting heavy crates and other objects even when the crates reside against or in close proximity to a wall.

In one example, a lifting mechanism can include a set of extendable supports that can slide under a crate, allowing for the attachment of a lifter component (also referred to herein as a “lifter”) at each end of the extendable supports. The lifter mechanism, which can be adjustable in length, is used in conjunction with bolts or other fasteners to raise a crate off the ground. Once lifted, the crate is supported by rotating wheels attached to the lifter component, enabling easy movement.

In another example, systems herein can be utilized when a crate is placed against a wall and the insertion of extendable supports is not feasible. In this example, the system can include a set of boots that are mounted to each end of the crate. A boot, as referred to herein, can include any suitable attachment that can be affixed directly to a crate, wherein the attachment enables coupling a lifter component to the crate. For example, a lifter component can be mounted to each of the boots and the crate can be lifted by rotating bolts through each lifter. In this example, crates can be moved even when initial placement restricts the use of extendable supports. The techniques herein include an innovative design that simplifies the process of moving heavy crates, reduces the risk of injury, and increasing efficiency in environments where space constraints and safety are concerns.

FIG. 1 depicts an example block diagram of a lifting mechanism attached to a crate. In some examples, the lifting mechanism 100 can move, lift, or otherwise relocate any suitable object including crates 102, or the like. The lifting mechanism 100 can be configured to be attached to a crate 102 so that the crate 102 can be lifted, handled, and transported with minimal manual effort and increased safety. The lifting mechanism 100 herein is engineered to be robust yet versatile, capable of securely attaching to various crate sizes and weights.

In some examples, any number of boots 104 can be coupled or attached to a lifter component 106. The boots 104 of FIG. 1 reside within the lifter component 106 so that the boots 104 are not visible. The boots 104 attach to the crate 102 and are described in greater detail below in relation to FIG. 4.

The lifter component 106 can include any number of wheels 108 or any other component that enables moving the crate 102. In some examples, the lifter component 106 can be attached or coupled to the boots 104 with an end bolt 110. A second top bolt 112 can be placed through the lifter component 106 to affix or attach the lifter component 106 to the boots 104. Rotating the top bolt 112 can result in the boots 104 rising from the floor or any other surface supporting the crate 102. A predetermined number of rotations of the top bolt 112 can cause the boots 104 to be lifted to an expected height above the floor. The crate 102 can then be moved in any suitable direction by applying force to the crate 102 in a parallel direction to the floor so that the wheels 108 engage and move or relocate the crate 102.

It is to be understood that the block diagram of FIG. 1 is not intended to indicate that the lifting mechanism 100 is to include all of the components shown in FIG. 1. Rather, the lifting mechanism 100 can include fewer or additional components not illustrated in FIG. 1 (e.g., additional supports, bolts, or boots, etc.).

Figure 2:
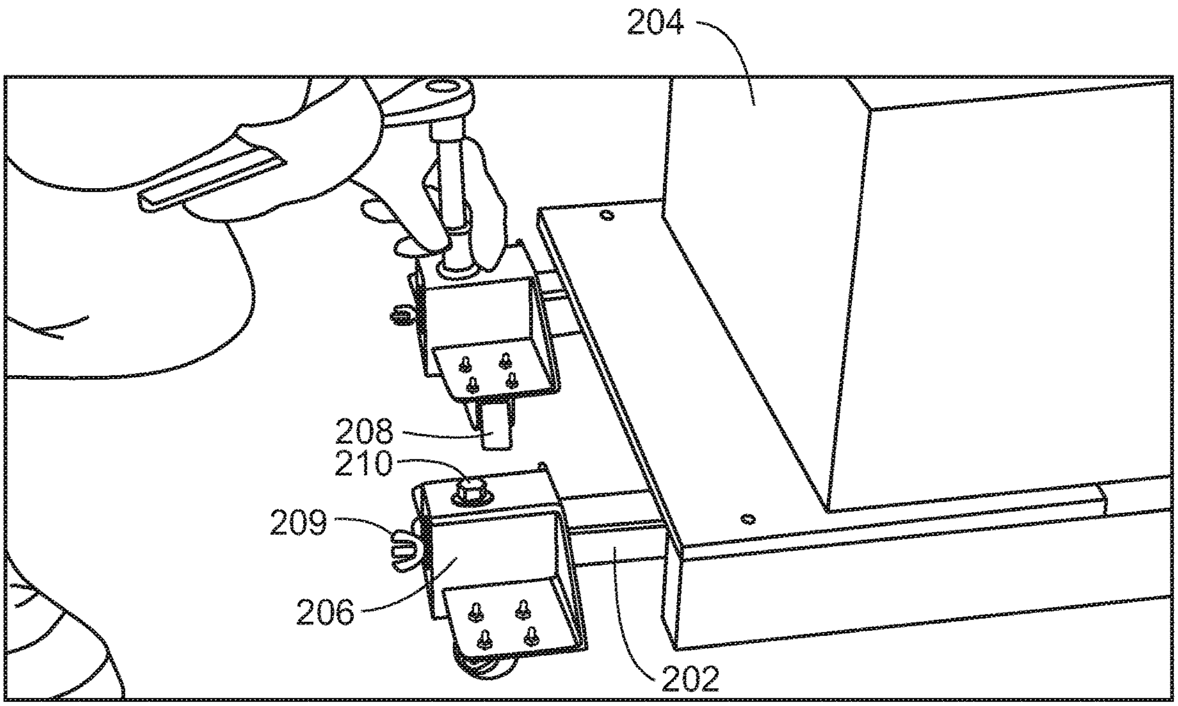
FIG. 2 is a perspective view of a lifting mechanism attached to an extendable support.

FIG. 2 depicts an example block diagram of a lifting mechanism with extendable supports. In some examples, the lifting mechanism 200 can include any number of extendable supports 202 that can be inserted, placed, mounted, or the like underneath a crate 204 or any other suitable object to be lifted. The extendable supports 202 can be coupled or attached to a lifter component 206 on either end of each extendable support 202. The lifter component 206 can include any number of wheels 208 or any other component that enables moving the crate 204. In some examples, the lifter component 206 can be attached or coupled to the extendable support 202 with an end bolt 209. A second top bolt 210 can be placed through the lifter component 206 to affix or attach the lifter component 206 to the extendable support 202. Rotating the top bolt 210 can result in the extendable support 202 rising from the floor or any other surface supporting the crate 204. A predetermined number of rotations of the top bolt 210 can cause the extendable support 202 to be lifted an expected amount from the floor. The crate 204 can then be moved in any suitable direction by applying force to the crate 204 in a parallel direction to the floor so that the wheels 208 engage and move or relocate the crate 204.

To facilitate the movement of the crate 204 once lifted, the lifting mechanism 200 may be equipped with any suitable number of wheels 208 or casters. These wheels 208 can be omnidirectional to allow for easy maneuvering in tight spaces. In some designs, the wheels 208 may retract or fold away for transporting the lifting mechanism 200 when there is no load on the lifting mechanism 200.

It is to be understood that the block diagram of FIG. 2 is not intended to indicate that the lifting mechanism 200 is to include all of the components shown in FIG. 2. Rather, the lifting mechanism 200 can include fewer or additional components not illustrated in FIG. 2 (e.g., additional extendable supports, bolts, or boots, etc.). For example, the lifting mechanism 200 can include any number of additional features. As discussed in greater detail below in relation to FIG. 9, the additional features can include load sensors that prevent the lifting mechanism 200 from operating if a crate 204 exceeds a safe weight limit, as well as locking mechanisms that secure the crate in place once lifted. In some examples, a surface of the extendable supports 202 can be fitted with a non-slip section, such as short spikes approximately 1-2 mm in height, among other non-slip features, that can penetrate a wooden crate once the lifting process starts, which can prevent the crate from moving on the extendable supports 202 positioned under the crate. Emergency stop buttons and fail-safes, such as mechanical locks that engage in the event of a malfunction, can also be incorporated into the lifting mechanism 200.

In some examples, the lifting mechanism 200 can also include any suitable control system. For example, a control system of the lifting mechanism 200 can be manual, semi-automatic, or fully automatic. Manual controls may involve hand cranks or levers to activate the lifting process. Semi-automatic systems may use buttons or switches to control actuators in the lifting mechanism 200, while fully automatic systems might incorporate sensors and programmable logic controllers (PLCs) to manage the lifting operation.

Figure 3A:
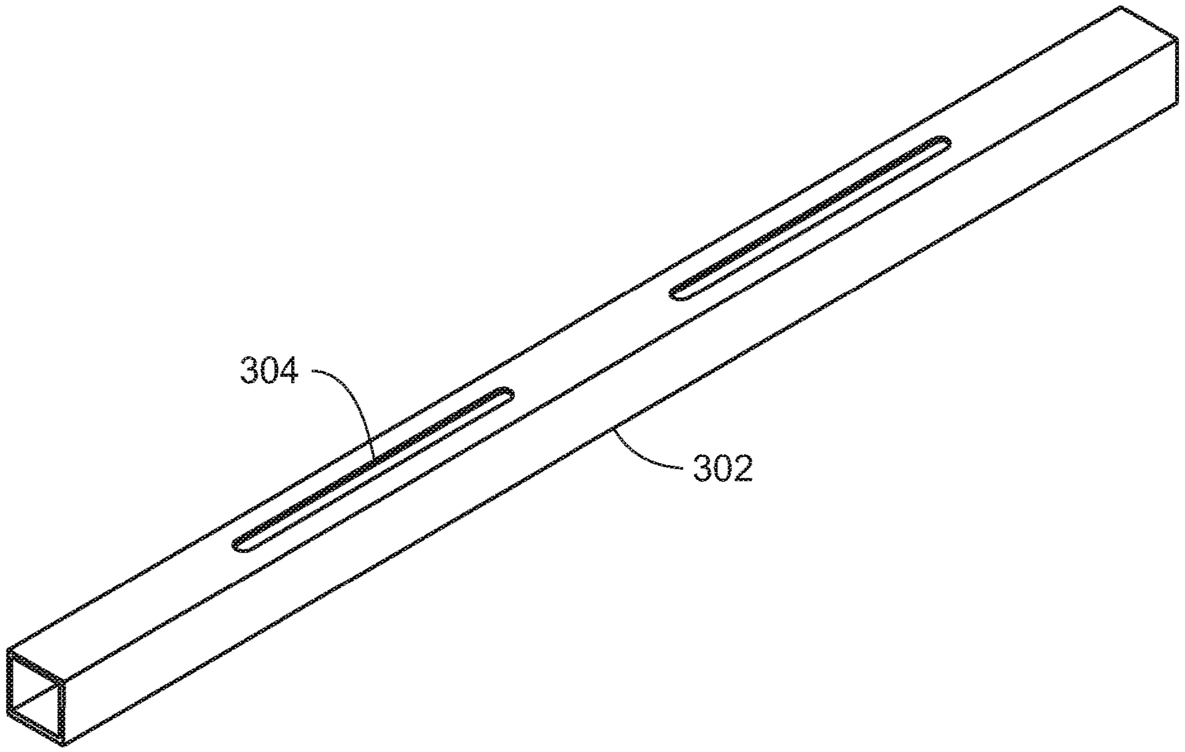
FIGS. 3A, 3B, and 3C depict components of the lifting mechanism that include extendable supports.
Figure 3B:
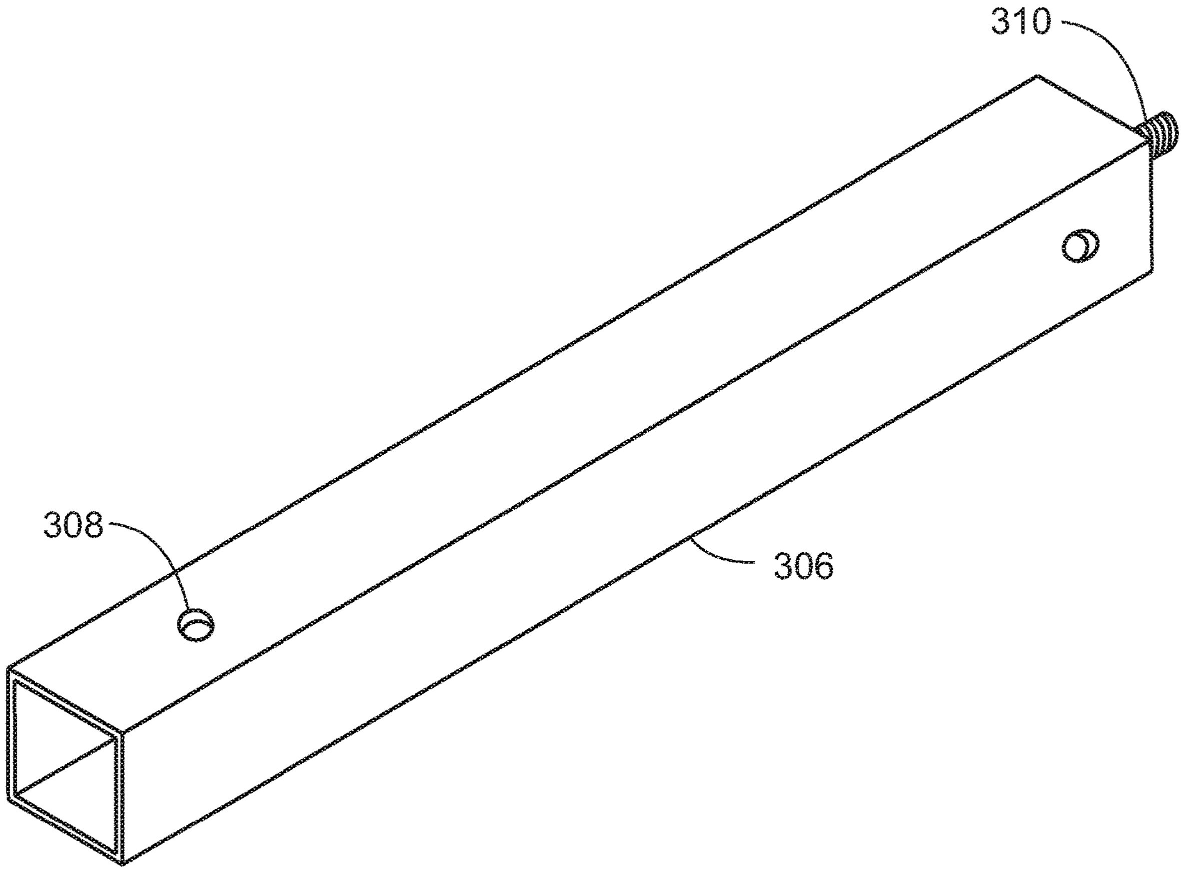
Figure 3C:
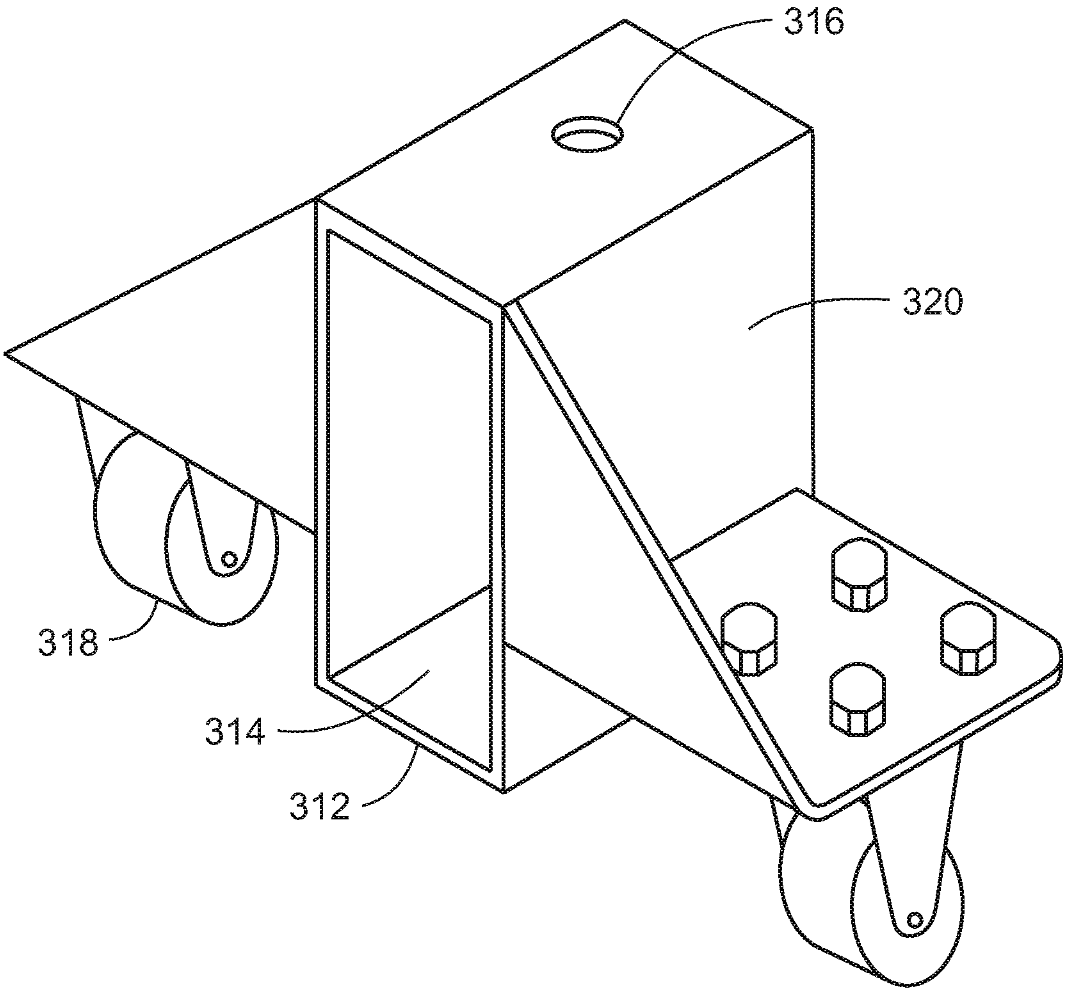

FIGS. 3A, 3B, and 3C depict components of the lifting mechanism that include extendable supports. In FIG. 3A, the lifting mechanism 300 can include a center portion 302 of an extendable support 202 that is illustrated in FIG. 2. In some examples, the center portion 302 of the extendable support 202 can include any number of slots 304 or openings that enable the center portion 302 of the extendable support 202 to be connected to end supports (306 of FIG. 3B). For example, the center portion 302 of the extendable support 202 can include one or more openings 304 or slots that enable a fastener (not depicted) to attach an end support (not depicted) to each side of the center portion 302. In some examples, the slots 304 can be oval, circular, rectangular, or any other suitable shape and the length of the slots 304 can be based on a length of extension for the extendable support 202. For example, a slot 304 with a length of 0.5 meters can enable adjusting the extendable support 202 up to 0.5 meters on each side of the extendable support 202. The slots 304 can enable lifting crates of varying sizes in some examples.

In some examples, the center portion 302 of the extendable support 202 can enable telescopic movement so that the extendable supports 202 can extend and retract to accommodate crates of various sizes. For examples, the center portion 302 can enable an end support (306 of FIG. 3B) to connect at any suitable location to the center portion 302 to allow for the end support (306 of FIG. 3B) of the lifting mechanism 300 to extend farther away from the center portion 302 to accommodate for larger crates. In some examples, a size of the openings or slots 304 in the center portion 302 of the lifting mechanism 300 can be configured to determine a distance that the end supports (306 of FIG. 3B) can extend away from the center portion 302. For example, larger slots or openings 304 in the center portion 302 of the extendable supports 202 can enable the extendable supports 202 to be located farther apart and to support larger crates, while smaller slots or openings 3046 in the center portion 302 can reduce the distance between the end supports 3 (306 of FIG. 3B) and accommodate smaller crates.

FIG. 3B depicts end supports 306 that connect to the center portion 302 of the extendable supports 202. In some examples, the end supports 306 can include any number of slots or openings 308 for attaching the end supports 306 to the center portion 302 of the extendable support 202. The end supports 306 can also include any number of bolts 310 that extend away from the end supports 306. The bolts 310 can be used to attach a lifter component (312 of FIG. 3C) to the end support 306.

FIG. 3C depicts an example lifter component 312 that is coupled to the end supports 306. The lifter component 312 can include a slot 314 through which the bolt 310 of the end support 306 can be placed. In some examples, a wingnut (not depicted) or any other suitable nut can be placed on the bolt 310 extending through the lifter component 312 to couple the lifter component 312 to an end support 306. In some examples, any number of openings 316 can be located at a top of the lifter component 312 to accept bolts (310 of FIG. 2) or other fasteners. For example, one or more bolts (also referred to herein as top bolts) 210 can be rotated or tightened through the top of the lifter component 312 to pull the end support 306 higher and thereby lift a crate off a floor or other surface.

In some examples, wheels 318 coupled to the lifting mechanism 300 can be configured to rotate any number of degrees without contacting the lifter component 312. For example, the wheels 318 can be configured so that the wheels 318 are placed farther away from the base plate 320 of the lifter component 312 and the distance between the wheels 318 and the lifter component 312 can be configured based on a radius or diameter of the wheels 318 so that larger wheels 318 with a higher load capacity can be positioned farther from the base plate 320 of the lifter component 312.

Figure 4:
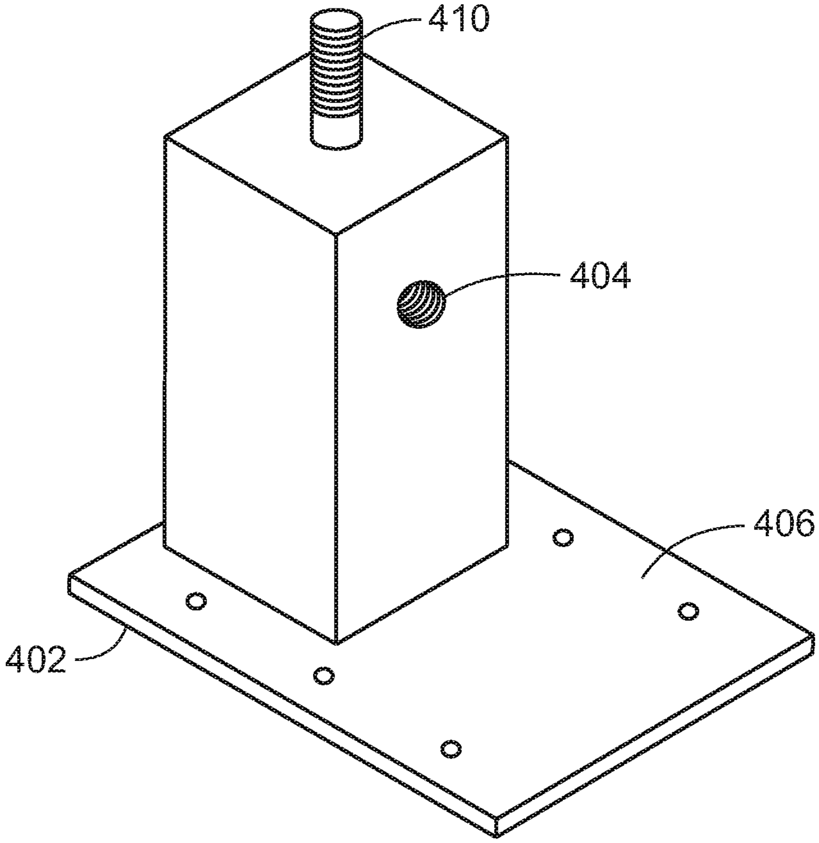
FIG. 4 depicts components of a lifting mechanism that are attachable to a crate.

FIG. 4 depicts components of a lifting mechanism that are attachable to a crate. In FIG. 4, the lifting mechanism 400 can include an example boot 402 that can include a bolt housing 404 that extends away from a base plate 406 of the boot 402. The bolt housing 404 can accept any suitable bolt 410 or fastener. In some examples, the bolt 410 can be rotatable to lift the boot 402 within a lifter component 312 illustrated in FIG. 3C.

In some examples, a lifting mechanism 400 can utilize any number of boots 402 coupled to lifter components, such as the lifter component 312 of FIG. 3C For example, the lifting mechanism 400 can include one, two, three, or more boots 402 attached to an edge or side of a crate to be lifted. In some examples, any number of boots 402 can be attached to any number of sides or edges of a crate. In some examples, a combination of boots 402 and any number of extendable supports, such as extendable supports 202 of FIGS. 3A-3C, can be used to lift a crate. For example, any number of extendable supports, such as extendable supports 202 of FIG. 2 can be placed under the crate, in some examples, to provide additional weightlifting capacity.

In some examples, each boot 402 can be affixed to a crate including any suitable electro-magnet. For example, rather than using screws, bolts, or the like to affix a boot 402 to a crate, a base plate 406 of the boot 402 can be coupled to a magnet or include a magnet. The electro-magnet of the boot 402 can be used to attach the boot 402 to a metal crate. In some examples, a strength of the magnetic force of the magnet of the boot 402 can determine a weight capacity of the boot 402 attached to a lifter component. For example, a magnet that can support 50 kilograms can be coupled to or incorporated into a boot 402 so that the boot 402, when attached to a lifter component, can support up to 50 kilograms. In some examples, a configuration of a set of boots 402 attached to a crate can lift 100 kilograms or 200 kilograms, among others.

In some examples, the bolt housing 404 of the boot 402 can be configured to be placed along an edge of a base plate 406 of the boot 402. The location of the bolt housing 404 at the edge of the boot plate 406, rather than the center of the boot plate 406, can prevent incorrect installation of the boot 402 to a crate.

As discussed above, the boot 402 can be coupled or attached to a lifter component, such as the lifter component 312 of FIG. 3C, which can include any number of wheels 318, such as a single wheel, two wheels, three wheels, or the like. The wheels 318 can be fixed or can be configured to rotate any number of degrees. In some examples, the number of wheels 318, the materials of the wheels 318, or a combination thereof can determine a weight capacity of the lifting mechanism 400.

Figure 5A:
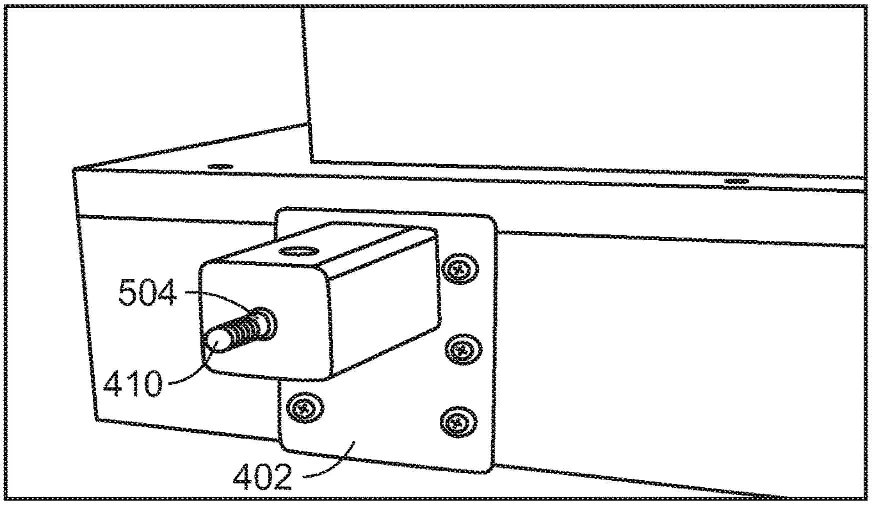
FIGS. 5A, 5B, and 5C are block diagrams of the lifting mechanism components that are attachable to a crate.
Figure 5B:
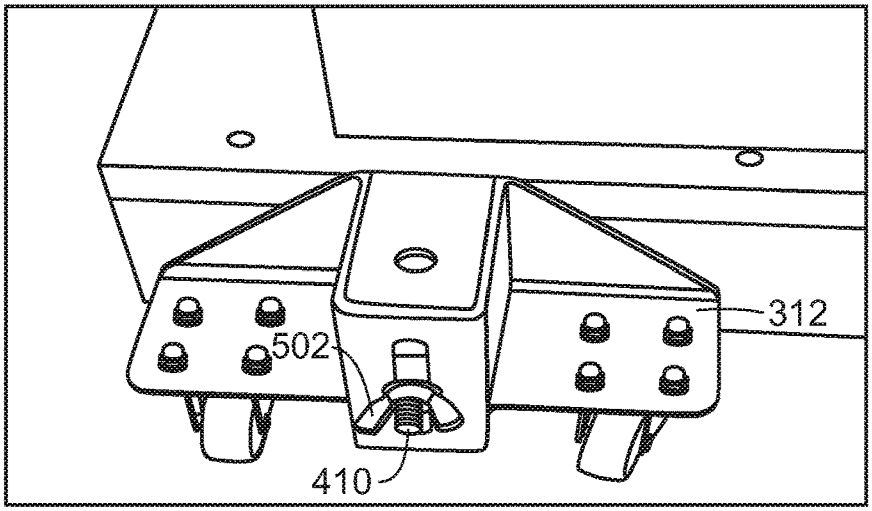
Figure 5C:
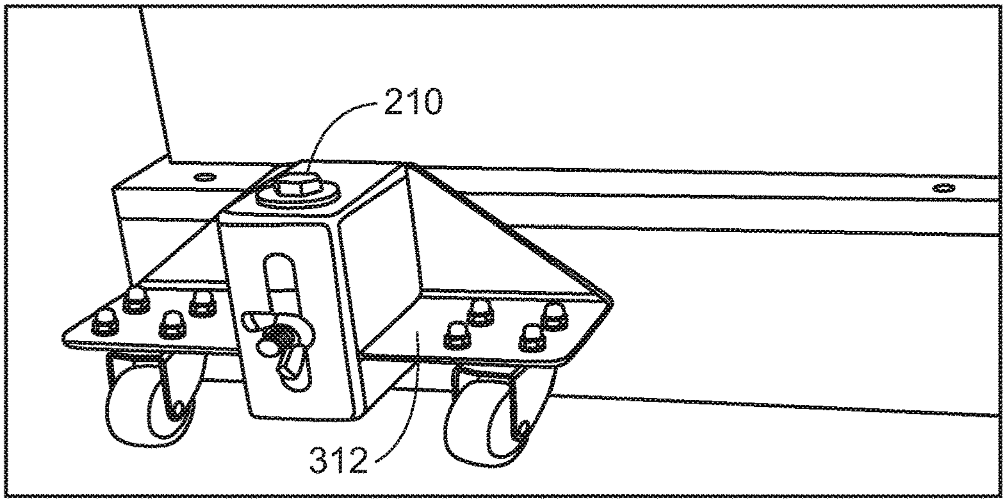

FIGS. 5A, 5B, and 5C are block diagrams of the lifting mechanism components that are attachable to a crate. FIG. 5A depicts attaching a boot 402 to a crate with any number of screws or any other fasteners. The boot 402 includes a bolt 410 extending away from the boot 402 that enables securing a lifter component 312 to the boot 402.

In some examples, a bolt 410 extending from the boot 402 can accept a wingnut (502 of FIG. 5B) to couple a lifter component 312 to the boot 402. The bolt 410 extending from the boot 402 can include a shank 504 at the base of the bolt 410 to prevent the wingnut 502 from being overtightened, binding the boot 402 and lifter component 312, and causing friction during the lifting action. The shank 504 can ensure that the lifter component 312 is configured to be raised or lowered as the top bolt 410 is secured to the lifter component 312.

FIG. 5B depicts attaching a lifter component 312 to a boot 402 with a wingnut 502 placed on the bolt 410 extending away from the boot 402. In some examples, the wingnut 502 may not completely or fully fasten the lifter component 312 to prevent binding to the boot 402, which enables the bolt 410 extending through the lifter component 312 to raise or lower as a top bolt, such as top bolt 210 of FIG. 2, is inserted into the lifter component 312 as illustrated in FIG. 5C.

In FIG. 5C, the top bolt 410 can be inserted through the lifter component 312 into the boot 402. The top bolt 210 can be rotated with any suitable socket, wrench, motorized lifter component, or the like. The top bolt 210 can pull the boot 402 towards the top of the lifter component 312 as the top bolt 210 is rotated, which can result in the crate lifting off the floor or any other surface supporting the crate. In some examples, the top bolt 210 can be rotated any number of times until the crate is lifted off the floor to a predetermined height. In some examples, any number of boots 402 can be fastened or attached to a crate and each boot 402 can be coupled to a lifter component 312 and a top bolt 210 to lift a crate off a floor.

Figure 6A:
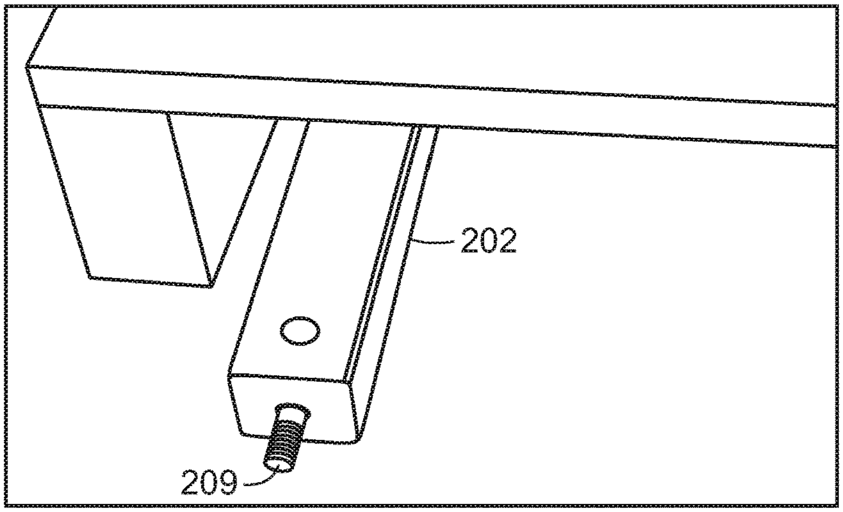
FIGS. 6A, 6B, and 6C are block diagrams of the lifting mechanism components that are attachable to an extendable support.
Figure 6B:
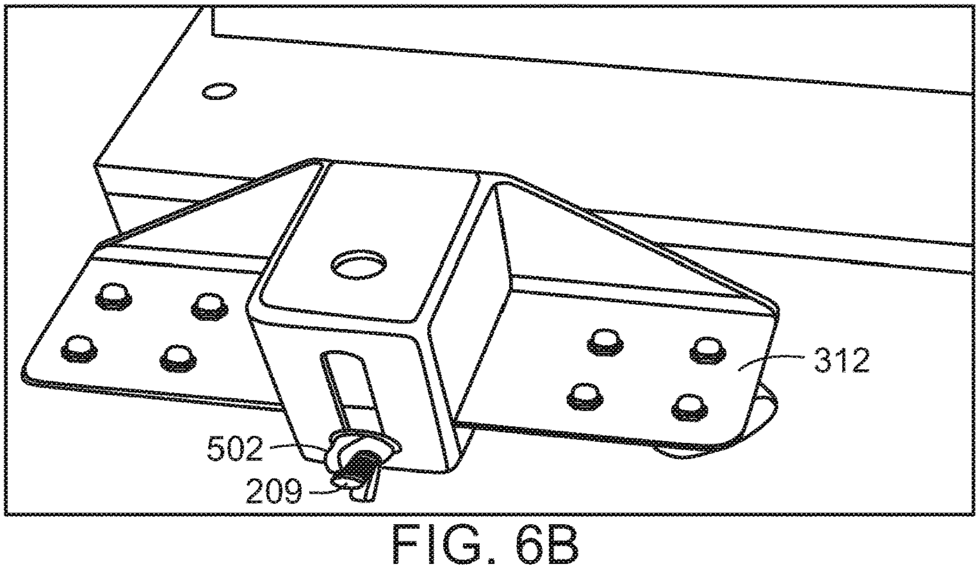
Figure 6C:
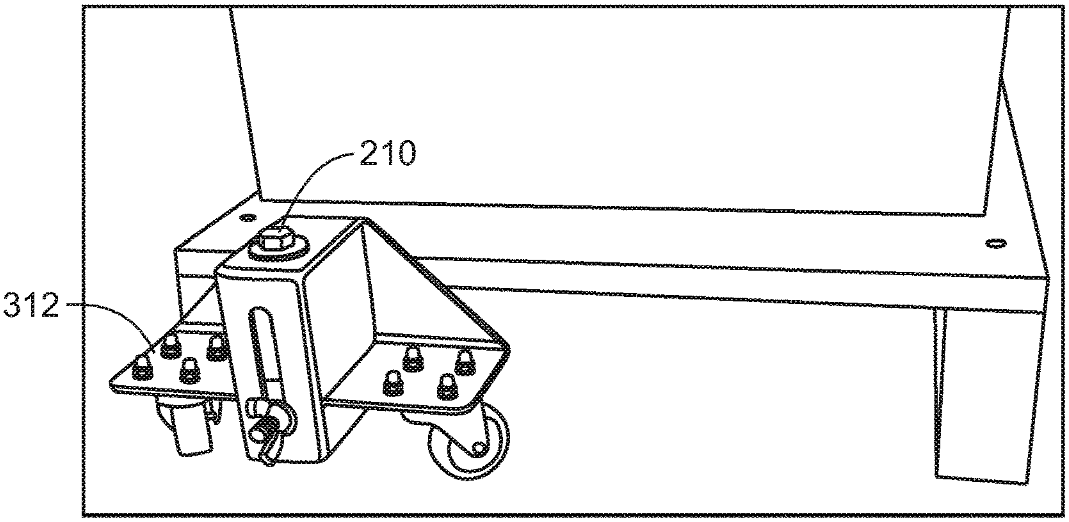

FIGS. 6A, 6B, and 6C are block diagrams of the lifting mechanism components that are attachable to an extendable support. FIG. 6A depicts sliding, inserting, or otherwise placing any number of extendable supports 202 under a crate. In some examples, any number of extendable supports 202 can be used to lift the crate off a floor. Each extendable support 202 can include a bolt, such as the end bolt 209 of FIG. 2, that extends away from the crate and enables attaching a lifter component 312 to each end of an extendable support 202.

FIG. 6B depicts attaching a lifter component 312 to an extendable support 202 with a wingnut 502 placed on the bolt 209 extending away from the extendable support 202. In some examples, the wingnut 502 may not completely or fully fasten the lifter to the support, which enables the bolt 209 extending through the lifter component 312 to raise or lower as a top bolt 210 is inserted into the lifter component 312 in FIG. 6C.

In FIG. 6C, the top bolt 210 can be inserted through the lifter component 312 into the extendable support 202. The top bolt 210 can be rotated with any suitable socket, wrench, motorized lifter component, or the like. The top bolt 210 can pull the extendable support 202 towards the top of the lifter component 312 as the top bolt 210 is rotated, which can result in the crate lifting off the floor or any other surface supporting the crate. In some examples, the top bolt 210 can be rotated any number of times until the crate is lifted off the floor to a predetermined height. In some examples, any number of extendable supports 202 can be used to lift a crate.

Figure 7:
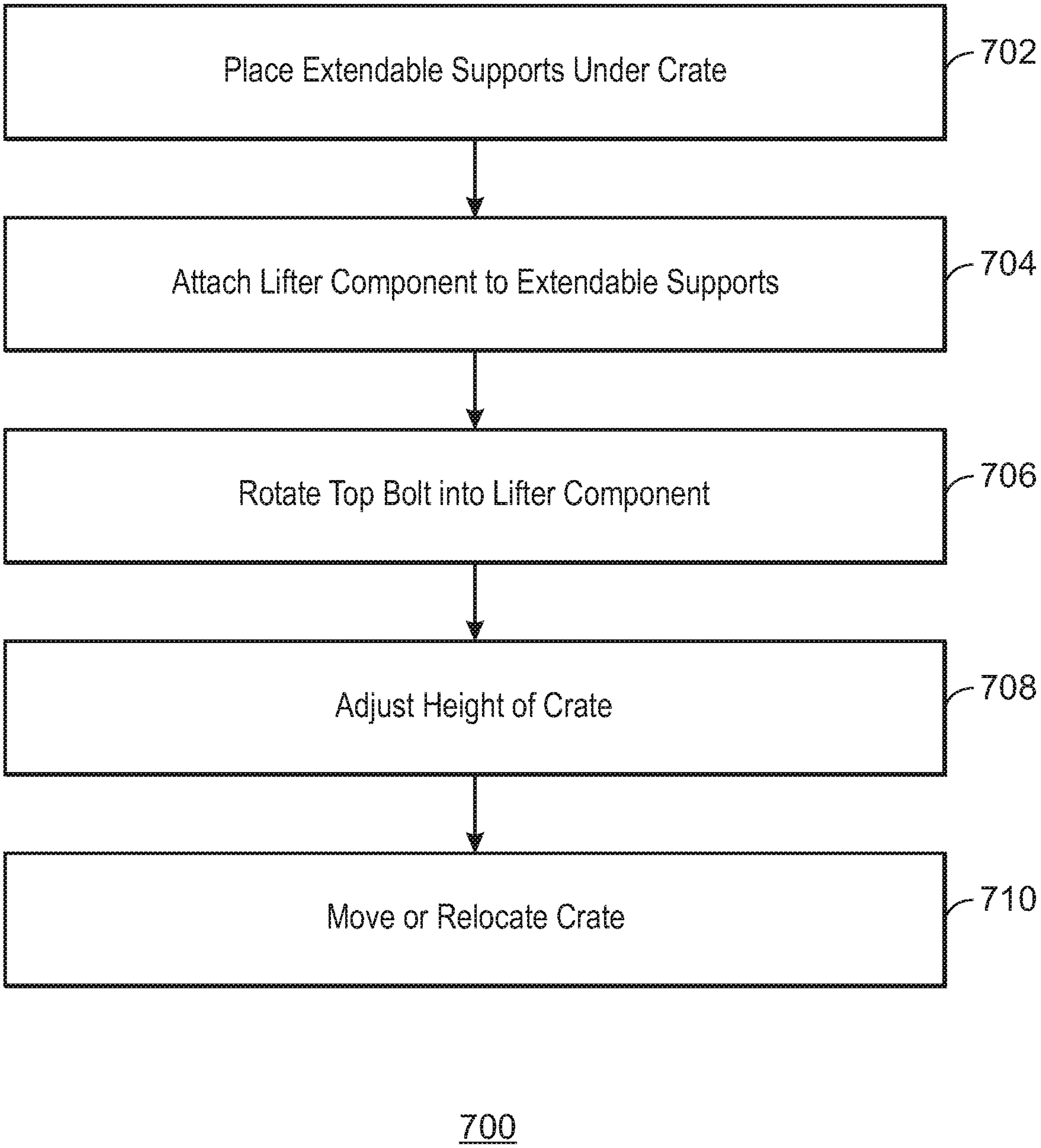
FIG. 7 is a process flow diagram for operating a lifting mechanism with extendable supports.

FIG. 7 is a process flow diagram for operating a lifting mechanism with extendable supports. In some examples, the method 700 can be implemented with any suitable device such as the lifting mechanisms 300, 400, or 900 of FIGS. 3, 4, and 9 respectively.

At block 702, the method 700 can include placing any suitable number of extendable supports, such as metal supports, or supports of any suitable solid material, under the crate if the crate is in an accessible location. For example, any number of extendable supports can be placed under the crate as long as the crate is not against a wall or other surface that prevents sliding or placing the extendable supports under the crate. In some examples, the supports can be slid under the crate into position at any suitable distance. For example, the extendable supports can be spaced apart at any suitable distance so that the weight of the crate is centered and stable on the supports.

At block 704, the method 700 can include attaching a lifter component to each end of each extendable support. For example, the lifter component can be coupled to an extendable support with a bolt, such as end bolt 209 of FIG. 2, extending from the end of the extendable support. In some examples, a wingnut or any other suitable fastener can be used to secure the bolt within a slot of a side of the lifter component.

At block 706, the method 700 can include using any suitable technique for rotating or turning a top bolt into each extendable support through a lifter component. In some examples, a socket and wrench, cordless screwdriver, automated electronic component, or the like can be used to rotate the top bolt and lift the crate off the floor. As the top bolts turn, the crate is gradually lifted off the ground.

At block 708, the method 700 can include adjusting a height of the crate as necessary by rotating the top bolt additionally to raise the crate or loosening the top bolt to lower the crate. At block 710, the method 700 can include moving or relocating the crate to a desired location once the lifting mechanism has lifted the crate to a predetermined height. In some examples, wheels attached or coupled to each lifter component can be used once the crate is elevated to the desired height. These wheels allow the user to move the crate effortlessly within a space. In some examples, as discussed below in relation to FIG. 9, a remote control component can be used to command the wheels to rotate and swivel as needed.

The process flow diagram of method 700 of FIG. 7 is not intended to indicate that all of the operations of blocks 702-710 of the method 700 are to be included in every example. Additionally, the process flow diagram of method 700 of FIG. 7 describes a possible order of executing operations. However, it is to be understood that the operations of the method 700 can be implemented in various orders or sequences. In addition, in some examples, the method 700 can also include fewer or additional operations.

Figure 8:
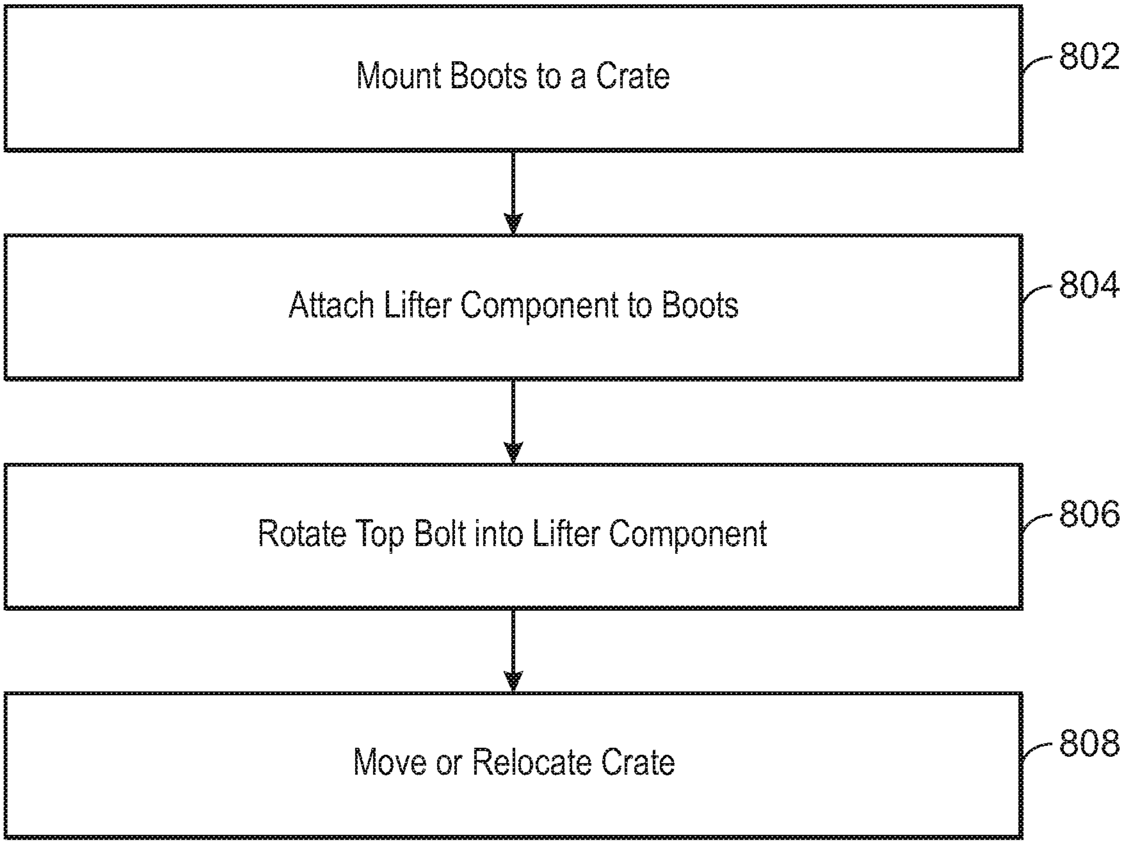
FIG. 8 is a process flow diagram for operating a lifting mechanism that is attachable to a crate.

FIG. 8 is a block diagram of the lifting mechanism components that are attachable to a crate. In some examples, the method 700 can be implemented with any suitable device such as the lifting mechanisms 300, 400, or 900 of FIGS. 3, 4, and 9 respectively.

At block 802, the method 800 can include mounting any number of boots to a crate. In some examples, boots can be affixed or mounted to a crate if the crate is against a wall and an extendable support cannot be placed under the crate. In some examples, any number of boots can also be attached to a crate if the boots are preferred over lifting the crate with extendable supports.

At block 804, the method 800 can include attaching a lifter component to each boot with a top bolt as illustrated in FIG. 5B. At block 806, the method 800 can include lifting the crate off a floor by rotating the top bolt through the lifter component. At block 808, the method 800 can include moving or relocating the crate. In some examples, moving the crate can include applying a force parallel to the floor to engage the wheels of the lifting mechanism. The force can be applied manually or by any suitable electronic component coupled to the crate and the lifting mechanism.

The process flow diagram of method 800 of FIG. 8 is not intended to indicate that all of the operations of blocks 802-808 of the method 800 are to be included in every example. Additionally, the process flow diagram of method 800 of FIG. 8 describes a possible order of executing operations. However, it is to be understood that the operations of the method 800 can be implemented in various orders or sequences. In addition, in some examples, the method 800 can also include fewer or additional operations.

Figure 9:
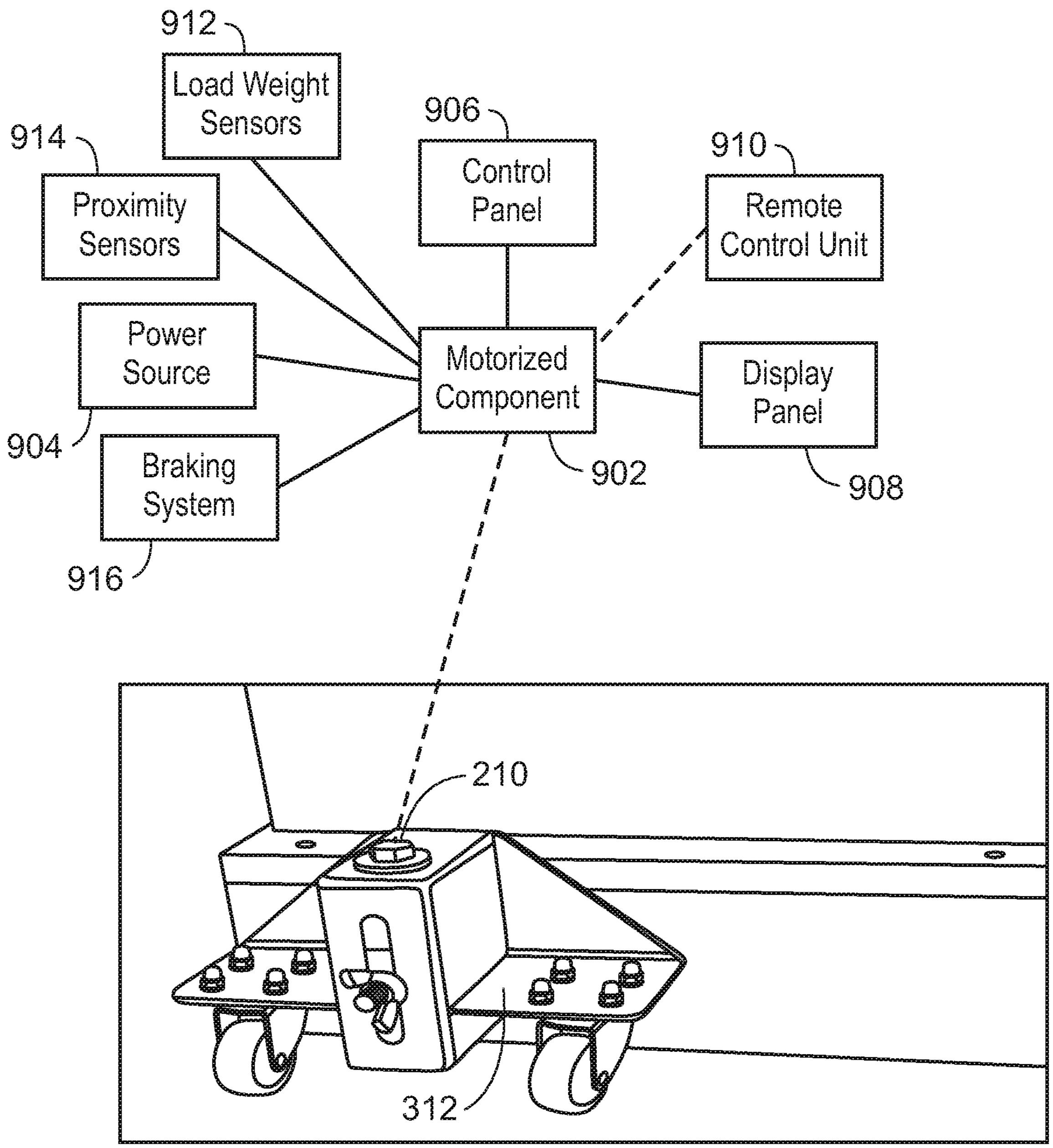
FIG. 9 is a perspective view of a lifting mechanism coupled to a motorized component.

FIG. 9 is a perspective view of a lifting mechanism coupled to a motorized component. In some examples, the lifting mechanism 900 can include any number of lifter components 312 coupled to any number of motorized components 902. The motorized components 902 can be configured to automatically operate the lifter components 312 by automatically rotating top bolts 210 in the lifter components 312 or any other suitable components. The motorized components 902 can automatically operate the rotation of top bolts 210 into boots 402 of FIG. 4 or extendable supports 202 of FIG. 2.

In some examples, each lifter component 312 can be coupled or attached to a single motorized component 902 or each lifter component 312 can be coupled or attached to a shared motorized component 902. As discussed above in relation to FIGS. 1-8, lifting mechanism 900 can include any number of extendable supports, boots, lifter components, sensors to indicate the crate has reached a preset height off the floor and the like. The extendable supports, boots, and lifter components can be made from any suitable material such as steel or plastic, among others.

In some examples, each motorized component 902 can be coupled to a power source 904 that can be included in the lifting mechanism 900 or the power source 904 can be externally located. For example, the power source 904 can be a rechargeable battery pack or a direct connection to an electrical outlet. In some examples, the power source 904 can provide power to a control panel 906. The control panel 906 can remotely control one or more motorized components 902 by executing instructions that determine when to rotate a top bolt 210 of the lifting mechanism 900, how much to rotate a top bolt 210 of the lifting mechanism 900, a preset distance between a crate and a surface to be maintained, or the like. In some examples, a control panel 906 can control or manage multiple lifter components 312 to ensure that a crate is level in the lifting mechanism 900.

In some examples, the control panel 906 can be controlled or receive instructions from a display panel 908, a remote control unit 910, or the like. The display panel 908 can display real-time information for the lifting mechanism 900 indicating a status of a lift such as current height of a crate, weight load of a crate, battery level, an orientation of the crate in relation to the surface under the crate, and the like. The system may include an audible alarm when moving plus a visual indicator (flashing light) as a warning that the crate may move at any moment. In some examples, the display panel 908 can display safety alerts that indicate if a crate is being moved without an expected height from a floor, a crate is being moved that exceeds a predetermined weight, a crate is being moved while the crate in unlevel, or the like. The display panel 908 can also provide an emergency stop button, among other inputs, that can halt operation of the lifting mechanism and apply brakes to the drive wheels of the lifting mechanism 900.

In some examples, the lifting mechanism 900 can include activating lifter components 312 using a remote control unit 910. The remote control unit 910 can send a wireless signal to the motorized components 902. For example, the motorized components 902 can include a motor (not depicted) that can turn to operate the top bolt 210 within the lifter component 312. As discussed above, rotation of the top bolts 210 can control raising or lowering the lifting mechanism 900 and the crate coupled to the lifting mechanism 900. In some examples, the remote control unit 910 can be configured to control any number of motorized components 902 coupled or otherwise attached to multiple crates. Accordingly, the remote control unit 910 can be configured to control a height of multiple crates from a surface or floor.

In some examples, the lifting mechanism 900 can include any number of safety features. For example, load weight sensors 912 can be coupled to the lifting mechanism or included in the lifting mechanism 900 to ensure that the lifting mechanism 900 is not overloaded, preventing operation if the crate's weight exceeds the safe operating capacity. In some examples, the lifting mechanism 900 can enable moving or lifting crates or other objects that are sensitive or uneven. In some examples, the lifting mechanism 900 can also include any number of proximity sensors 914 that can enable the lifting mechanism 900 to avoid doors, other crates, people, objects, and the like.

In some examples, the lifting mechanism 900 can also be integrated with other systems. For example, the lifting mechanism 900 may be designed to integrate with other systems, such as warehouse management systems (WMS) or enterprise resource planning (ERP) systems, allowing for coordinated logistics and inventory management. In some examples, incorporating Internet of Things (IoT) technology to connect the lifting mechanism 900 to a computer network can enable tracking, monitoring, and data collection on usage patterns for maintenance scheduling and inventory management.

The lifting mechanism 900 can also include any number of safety locks that can prevent accidental release or slippage during lifting and moving operations. For example, the lifting mechanism 900 can include an automatic braking system 916 as another vital safety feature. The automatic braking system 916 can engage when the crate is lifted to a certain height or if the remote control unit 910 is not actively issuing commands, preventing the crate from moving unexpectedly. In some examples, any number of the wheels of the lifting mechanism 900 can have a braking system 916 to securely lock the crate in place once it has been moved to the desired location. In some examples, the automatic braking system 916 can also engage when the crate is lifted.

It is to be understood that the block diagram of FIG. 9 is not intended to indicate that the lifting mechanism 900 is to include all of the components shown in FIG. 9. Rather, the lifting mechanism 900 can include fewer or additional components not illustrated in FIG. 9 (e.g., additional memory components, embedded controllers, additional modules, additional network interfaces, etc.). In some examples, the lifting mechanism 900 can include any number of attachments for specialized crates or additional functionality, such as calculating a weight measurement of crate, among others. The attachments can include hooks for lifting barrels or straps for securing irregularly shaped items, among others.

Figure 10:
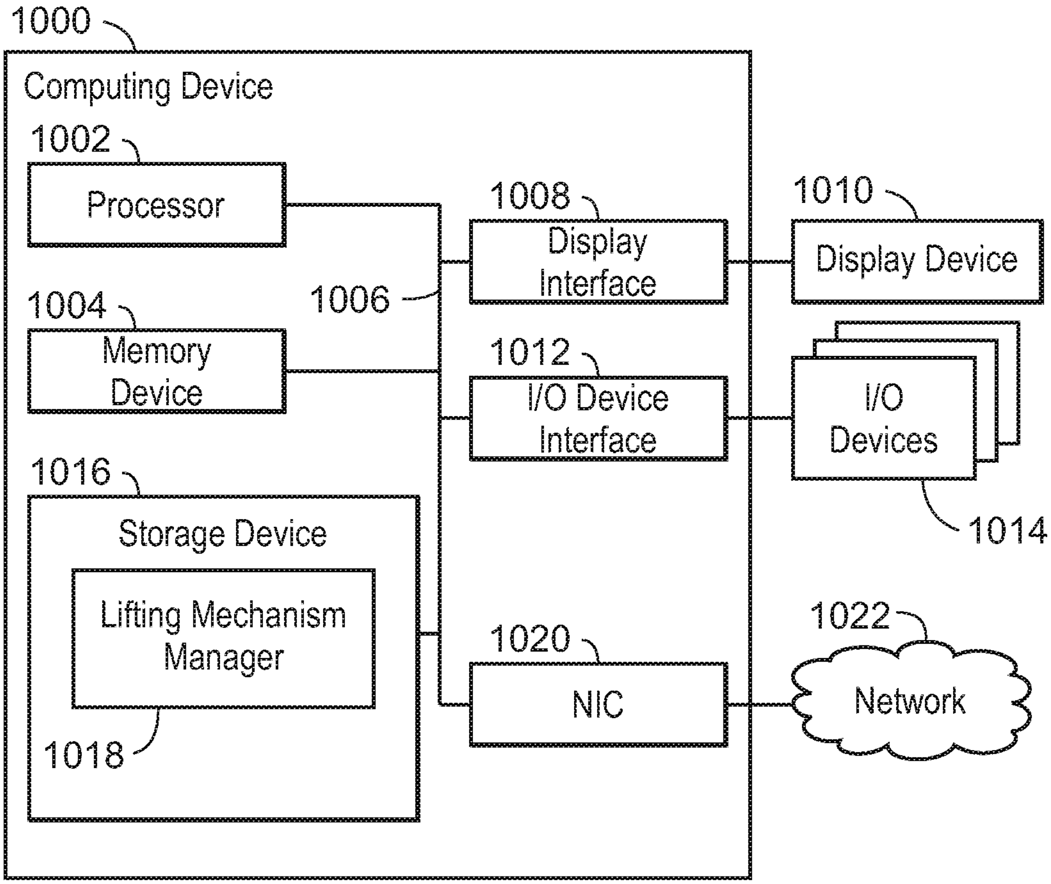
FIG. 10 is a block diagram of a device for operating a lifting mechanism.

FIG. 10 is a block diagram of an example of a computing device that can operate a crate lifting mechanism. The computing device 1000 may be, for example, a laptop computer, a desktop computer, a tablet computer, or a mobile phone, among others. The computing device 1000 may include a processor 1002 that is adapted to execute stored instructions, as well as a memory device 1004 that stores instructions that are executable by the processor 1002. The processor 1002 can be a single core processor, a multi-core processor, a computing cluster, or any number of other configurations. The memory device 1004 can include random access memory, read only memory, flash memory, or any other suitable memory systems. The instructions that are executed by the processor 1002 may be used to implement a method that can operate a crate lifting mechanism, as described in greater detail above in relation to FIGS. 2-4 and 6-9.

The processor 1002 may also be linked through the system interconnect 1006 (e.g., PCI, PCI-Express, NuBus, etc.) to a display interface 1008 adapted to connect the computing device 1000 to a display device 1010. The display device 1010 may include a display screen that is a built-in component of the computing device 1000. The display device 1010 may also include a computer monitor, television, or projector, among others, which is externally connected to the computing device 1000. The display device 1010 can include light emitting diodes (LEDs), and micro-LEDs, Organic light emitting diode OLED displays, among others.

The processor 1002 may be connected through a system interconnect 1006 to an input/output (I/O) device interface 1012 adapted to connect the computing device 1000 to one or more I/O devices 1014 The I/O devices 1014 may include, for example, a keyboard and a pointing device, wherein the pointing device may include a touchpad or a touchscreen, among others. The I/O devices 1014 may be built-in components of the computing device 1000 or may be devices that are externally connected to the computing device 1000.

In some embodiments, the processor 1002 may also be linked through the system interconnect 1006 to a storage device 1016 that can include a hard drive, an optical drive, a USB flash drive, an array of drives, or any combinations thereof. In some embodiments, the storage device 1016 can include any suitable applications. In some embodiments, the storage device 1016 can include a lifting mechanism manager 1018. In some embodiments, the lifting mechanism manager 1018 can electronically control a lifting mechanism by rotating any number of bolts or other fasteners coupled or attached to extendable supports under a crate, bolts attached to boots fastened to a crate, or a combination thereof. In some examples, the lifting mechanism manager 1018 can also control an automatic braking system coupled to wheels of a lifting mechanism or a remote control unit that sends instructions to lifting mechanisms. The lifting mechanism manager 1018 can also monitor in real-time load sensing sensors, proximity sensors, or any other sensors coupled or integrated into the lifting mechanism. The lifting mechanism manager 1018 cand also record for storage and investigation/analysis each transport trip by the lifting mechanism. The stored data can be used for future pre-programming of repeat transport trips.

In some examples, a network interface controller (also referred to herein as a NIC) 1020 may be adapted to connect the computing device 1000 through the system interconnect 1006 to a network 1022. The network 1022 may be a cellular network, a radio network, a wide area network (WAN), a local area network (LAN), or the Internet, among others. The network 1022 can enable data, such as alerts, among other data, to be transmitted from the computing device 1000 to remote computing devices, remote display devices, and the like. In some examples, the lifting mechanism manager 1018 can transmit, using the NIC 1020 and the network 1022, an alert to any suitable external device such as a mobile device or a computing device, among others.

It is to be understood that the block diagram of FIG. 10 is not intended to indicate that the computing device 1000 is to include all of the components shown in FIG. 10. Rather, the computing device 1000 can include fewer or additional components not illustrated in FIG. 10 (e.g., additional memory components, embedded controllers, additional modules, additional network interfaces, etc.). Furthermore, any of the functionalities of the lifting mechanism manager 1018 may be partially, or entirely, implemented in hardware and/or in the processor 1002. For example, the functionality may be implemented with an application specific integrated circuit, logic implemented in an embedded controller, or in logic implemented in the processor 1002, among others. In some embodiments, the functionalities of the lifting mechanism manager 1018 can be implemented with logic, wherein the logic, as referred to herein, can include any suitable hardware (e.g., a processor, among others), software (e.g., an application, among others), firmware, or any suitable combination of hardware, software, and firmware.

Figure 11:
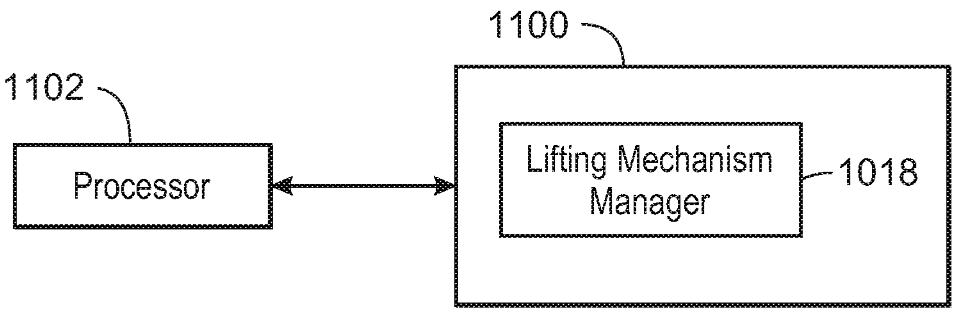
FIG. 11 is a block diagram of a computer-readable media for operating a lifting mechanism.

FIG. 11 is an example of a non-transitory machine-readable medium for operating a lifting mechanism, in accordance with examples. The non-transitory, machine-readable medium 1100 can implement the functionalities of the lifting mechanism manager 1018 of FIG. 10, among others. For example, a processor 1102 can access the non-transitory, machine-readable media 1100.

In some examples, the non-transitory, machine-readable medium 1100 can include instructions to execute a lifting mechanism manager 1018. For example, the non-transitory, machine-readable medium 1100 can include instructions for the lifting mechanism manager 1018 that cause the processor 1102 to operate a lifting mechanism to lift a crate off a floor by rotating any number of bolts or other fasteners. In some examples, the lifting mechanism manager 1018 can execute any instructions described above in relation to FIGS. 1-10.

In some examples, the non-transitory, machine-readable medium 1100 can include instructions to implement any combination of the techniques of the lifting mechanism manager 1018 described above.

EXAMPLES

In one example, a crate lifting system can include two or more extendable supports configured to slide under a crate and a set of lifters attachable, each of the lifters to be attached to an end of the two or more extendable supports, wherein each lifter is configured to raise the crate from a surface. The crate lifting mechanism can also include a set of bolts that engage with the two or more extendable supports through the set of lifters, wherein the set of bolts are configured to lift the crate as the set of bolts are rotated.

Additionally, or alternatively, the crate lifting system can include a set of rotating wheels attached to each lifter, allowing the lifted crate to be moved. In some examples, the two or more extendable supports enable lifting the crate when there is sufficient space on either side of the crate to insert the two or more extendable supports. Additionally, or alternatively, the set of bolts for raising the crate are rotatable by a socket, a wrench, or a combination thereof. Additionally, or alternatively, the crate lifting system can include a remote control unit configured to wirelessly operate an electronic lifter, including commands for lifting, lowering, and moving the crate.

Additionally, or alternatively, the crate lifting system can include a safety mechanism integrated into the electronic lifter, the safety mechanism configured to automatically engage a braking system in response to detecting the crate is lifted to a predetermined height. Additionally, or alternatively, the crate lifting system can include a safety mechanism integrated into the electronic lifter, the safety mechanism configured to automatically engage a braking system in response to detecting the remote control unit is not actively issuing commands. Additionally, or alternatively, the crate lifting system can include a set of load weight sensors incorporated into the two or more extendable supports or the electronic lifter, the set of load weight sensors configured to prevent operation of the crate lifting system in response to detecting an operating violation.

In some examples, a method for lifting a crate includes mounting a set of boots to each end of the crate when extendable support insertion is not possible, attaching a lifter to each of the boots, and raising the crate from a surface using bolts that engage with the each of the boots through the lifter attached to each of the boots.

In some examples, the lifter is attached to one of the boots using a bolt extending from the boot, the bolt orientation to be parallel to the surface. In some example, the lifter comprises a slot for the bolt extending from the boot parallel to the surface, the slot to enable the bolt to move vertically without contacting the lifter; and a second opening for inserting a top bolt. In some examples, rotating the bolts clockwise lifts the crate from the surface.

In some examples, a crate lifting system can include two or more extendable supports configured to slide under a crate and an electronic lifter attachable to each end of the two or more extendable supports, wherein the electronic lifter includes an integrated electric motor for raising and lowering the crate. The crate lifting system can also include a set of rotating wheels attached to each electronic lifter, the set of rotating wheels facilitating movement of a lifted crate, and an emergency stop feature configured to immediately stop a lifting operation for the crate.

Additionally, or alternatively, the crate lifting system can include a remote control unit configured to wirelessly operate the electronic lifter, including commands for lifting, lowering, and moving the crate. Additionally, or alternatively, the crate lifting system can include a safety mechanism integrated into the electronic lifter, the safety mechanism configured to automatically engage a braking system in response to detecting the crate is lifted to a predetermined height. Additionally, or alternatively, the crate lifting system can include a safety mechanism integrated into the electronic lifter, the safety mechanism configured to automatically engage a braking system in response to detecting the remote control unit is not actively issuing commands. Additionally, or alternatively, the crate lifting system can include a set of load weight sensors incorporated into the two or more extendable supports or the electronic lifter, the set of load weight sensors configured to prevent operation of the crate lifting system in response to detecting an operating violation.

In some examples, the operating violation comprises detecting a weight of the crate exceeds a specified safe operating capacity. In some examples, the operating violation comprises in response to detecting the crate has been lifted more than a predetermined height. In some examples, the emergency stop feature is accessible on the remote control unit or a control panel of the electronic lifter.

Various embodiments may be a system, a method, an apparatus or a computer program product at any possible technical detail level of integration. The computer program product can include a computer readable storage medium (or media) having computer readable program instructions thereon for causing a processor to carry out aspects of various embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform various aspects.

Various aspects are described herein with reference to flowchart illustrations or block diagrams of methods, apparatus (systems), and computer program products according to various embodiments. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that various aspects can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A crate lifting system comprising:

two or more extendable supports configured to slide under a crate;

a set of lifters attachable, each of the lifters to be attached to an end of the two or more extendable supports, wherein each lifter is configured to raise the crate from a surface; and a set of bolts that engage with the two or more extendable supports through the set of lifters, wherein the set of bolts are configured to lift the crate as the set of bolts are rotated.

2. The crate lifting system of claim 1, further comprising:

a set of rotating wheels attached to each lifter, allowing the lifted crate to be moved.

3. The crate lifting system of claim 1, wherein the two or more extendable supports enable lifting the crate when there is sufficient space on either side of the crate to insert the two or more extendable supports.

4. The crate lifting system of claim 1, wherein the set of bolts for raising the crate are rotatable by a socket, a wrench, or a combination thereof.

5. The crate lifting system of claim 1, further comprising a remote control unit configured to wirelessly operate an electronic lifter, including commands for lifting, lowering, and moving the crate.

6. The crate lifting system of claim 5, further comprising a safety mechanism integrated into the electronic lifter, the safety mechanism configured to automatically engage a braking system in response to detecting the crate is lifted to a predetermined height.

7. The crate lifting system of claim 5, further comprising a safety mechanism integrated into the electronic lifter, the safety mechanism configured to automatically engage a braking system in response to detecting the remote control unit is not actively issuing commands.

8. The crate lifting system of claim 5, further comprising a set of load weight sensors incorporated into the two or more extendable supports or the electronic lifter, the set of load weight sensors configured to prevent operation of the crate lifting system in response to detecting an operating violation.

* * * * *